United States Patent
Morovic et al.

(10) Patent No.: US 10,500,790 B2
(45) Date of Patent: Dec. 10, 2019

(54) THREE-DIMENSIONAL OBJECT SUBSTRUCTURES

(71) Applicant: Hewlett-Packard Development Company, L.P., Houston, TX (US)

(72) Inventors: Peter Morovic, Sant Cugat del Valles (ES); Jan Morovic, Colchester (GB); Jay S Gondek, Vancouver, WA (US); Juan Manuel Garcia Reyero Vinas, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 186 days.

(21) Appl. No.: 15/541,436

(22) PCT Filed: Jan. 30, 2015

(86) PCT No.: PCT/US2015/013841
§ 371 (c)(1),
(2) Date: Jul. 3, 2017

(87) PCT Pub. No.: WO2016/122615
PCT Pub. Date: Aug. 4, 2016

(65) Prior Publication Data
US 2018/0001566 A1  Jan. 4, 2018

(51) Int. Cl.
*B29C 64/393* (2017.01)
*B29C 64/386* (2017.01)
(Continued)

(52) U.S. Cl.
CPC .......... *B29C 64/386* (2017.08); *B29C 64/393* (2017.08); *B33Y 50/00* (2014.12);
(Continued)

(58) Field of Classification Search
CPC combination set(s) only.
See application file for complete search history.

(56) References Cited

U.S. PATENT DOCUMENTS 7,044,585 B2  5/2006  Walmsley et al.
8,705,144 B2  4/2014  Gullentops et al.
(Continued)

FOREIGN PATENT DOCUMENTS

CN  101416481 A  4/2009
CN  102256769 A  11/2011
(Continued)

OTHER PUBLICATIONS

Lou, Fundamentals of 30 halftoning, 1998, "Medical image computing and computer-assisted intervention—MICCAI 2015 : 18th international conference, Munich, Germany, Oct. 5-9, 2015; proceedings", Springer International Publishing, ISBN: 978-3-642-16065-3, vol. 1375, pp. 224-239 (Year: 1998).*
(Continued)

*Primary Examiner* — Brian W Wathen
*Assistant Examiner* — Hung H Dang
(74) *Attorney, Agent, or Firm* — HP Inc. Patent Department

(57) ABSTRACT

Methods and apparatus relating to substructures for 3D objects are described. In an example, a method for providing a three-dimensional halftone threshold matrix is described. The method may comprise receiving a substructure model representing a three-dimensional material structure and populating each location in the substructure model at which the structure exists with a halftone threshold value.

13 Claims, 3 Drawing Sheets

(51) Int. Cl.
*H04N 1/405* (2006.01)
*B33Y 50/02* (2015.01)
*G05B 19/4099* (2006.01)
*H04N 1/52* (2006.01)
*B33Y 50/00* (2015.01)

(52) U.S. Cl.
CPC .......... *B33Y 50/02* (2014.12); *G05B 19/4099* (2013.01); *H04N 1/405* (2013.01); *H04N 1/52* (2013.01); *G05B 2219/49023* (2013.01)

(56) References Cited

U.S. PATENT DOCUMENTS

| | | |
|---|---|---|
| 2004/0183796 A1 | 9/2004 | Velde et al. |
| 2005/0072113 A1 | 4/2005 | Collins et al. |
| 2007/0236736 A1* | 10/2007 | Tai ............... H04N 1/40087 358/3.01 |
| 2011/0012919 A1* | 1/2011 | Tai ............... H04N 1/40087 345/596 |
| 2014/0031967 A1 | 1/2014 | Unger et al. |
| 2014/0117588 A1 | 5/2014 | Schindler et al. |
| 2014/0277661 A1 | 9/2014 | Amadio et al. |
| 2014/0324204 A1* | 10/2014 | Vidimce ......... B29C 67/0088 700/98 |

FOREIGN PATENT DOCUMENTS

| | | |
|---|---|---|
| EP | 0414215 A2 | 2/1991 |
| EP | 1437882 B1 | 3/2011 |
| EP | 2644362 | 10/2013 |
| JP | 2011-227782 | 11/2011 |
| WO | WO-2005000592 | 1/2005 |

OTHER PUBLICATIONS

Lou, et al., "Fundamentals of 3D Halftoning", Lecture Notes in Computer Science, vol. 1375, 1998, pp. 224-239.

Chi Zhou, et al., "Three-Dimensional Digital Halftoning for Layered Manufacturing Based on Droplets", May 24, 2009 http://www-bcf.usc.edu/~yongchen/Research/NAMRC%2037-Halftoning_Final.pdf.

International Search Report & Written Opinion received in PCT Application No. PCT/US2015/013841, dated Jan. 30, 2015, 9 pages.

* cited by examiner

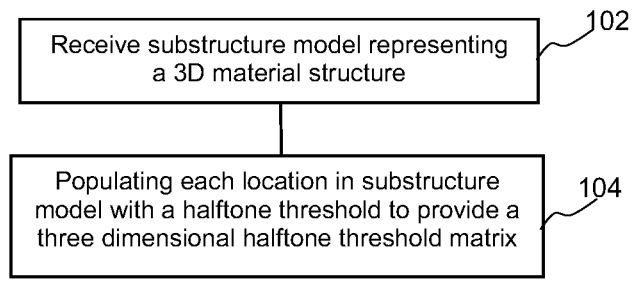
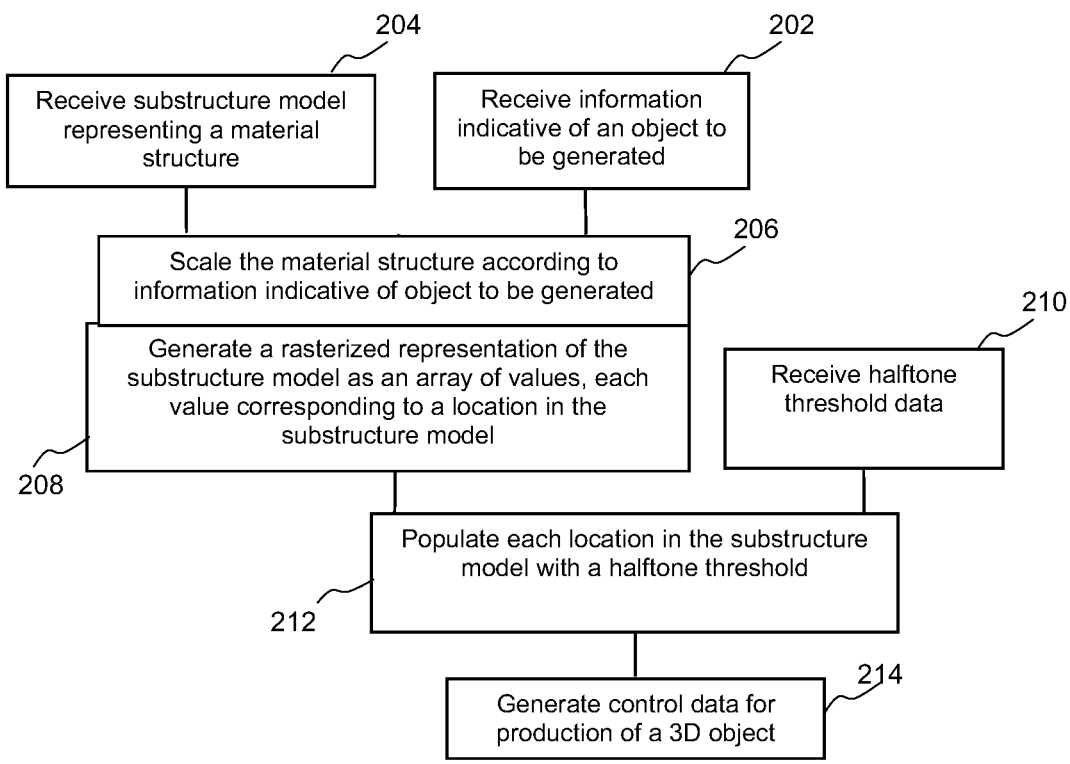

THREE-DIMENSIONAL OBJECT SUBSTRUCTURES

CLAIM FOR PRIORITY

The present application is a national stage filing under 35 U.S.C. § 371 of PCT application number PCT/US2015/013841, having an international filing date of Jan. 30, 2015, the disclosure of which is hereby incorporated by reference in its entirety.

BACKGROUND

Three-dimensional objects generated by an additive manufacturing process may be formed in a layer-by-layer manner. In one example of additive manufacturing, an object is generated by solidifying portions of layers of build material. In examples, the build material may be in the form of a powder, fluid or sheet material. The intended solidification and/or physical properties may be achieved by printing an agent onto a layer of the build material. Energy may be applied to the layer and the build material on which an agent has been applied may coalesce and solidify upon cooling. In other examples, three-dimensional objects may be generated by using extruded plastics or sprayed materials as build materials, which solidify to form an object.

Some printing processes that generate three-dimensional objects use control data generated from a model of a three-dimensional object. This control data may, for example, specify the locations at which to apply an agent to the build material, or where a build material itself may be placed, and the amounts to be placed.

BRIEF DESCRIPTION OF DRAWINGS

For a more complete understanding, reference is now made to the following description taken in conjunction with the accompanying drawings in which:

FIG. 1 is a flowchart of an example of a method in which a three dimensional halftone threshold matrix is generated;

FIG. 2 is a flowchart of an example of a method in which a three dimensional halftone threshold matrix is generated;

DETAILED DESCRIPTION

Figure 3:
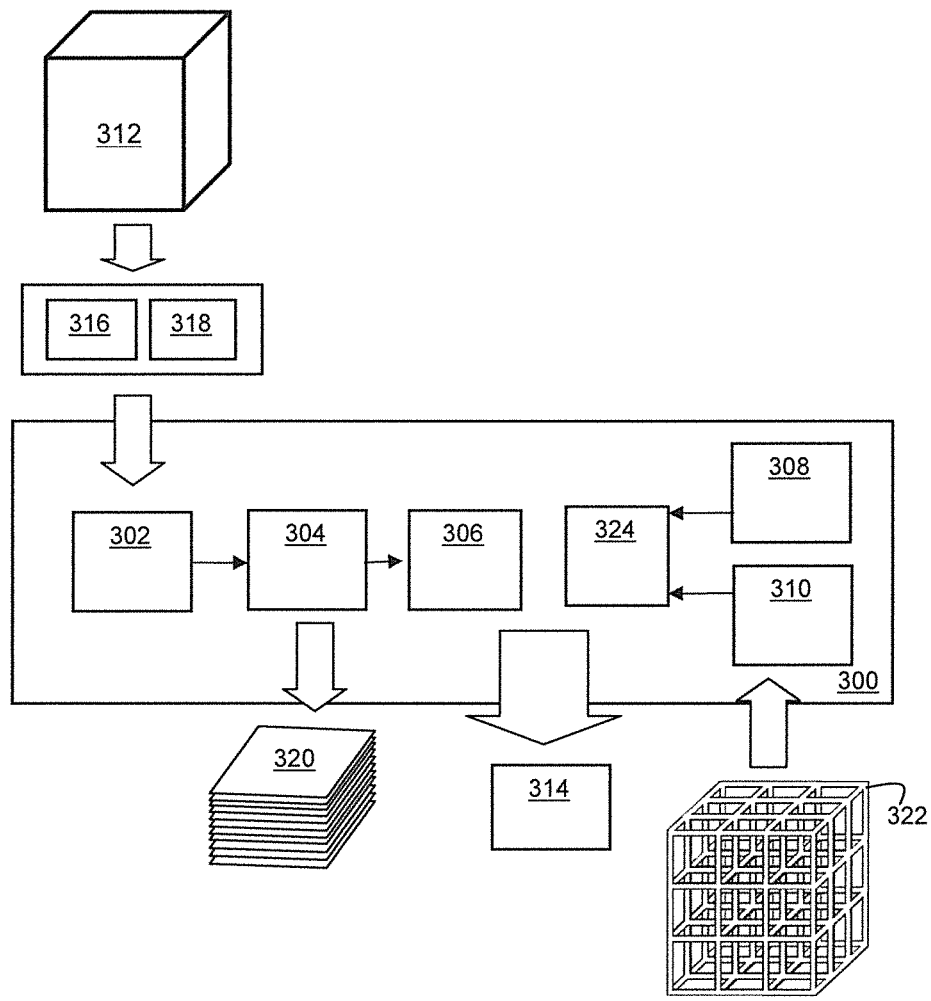
FIG. 3 is a simplified schematic of an example of processing apparatus for generating control data for production of a three-dimensional object.

Some examples described herein provide an apparatus and a method for generating control data that may be used to produce a three dimensional object. Some examples allow arbitrary three dimensional content with a variety of specified object properties to be processed and used to generate a three-dimensional object. These object properties may comprise appearance properties (color, transparency, glossiness, etc), conductivity, density, porosity and/or mechanical properties such as strength.

In some examples herein, three-dimensional space is characterised in terms of 'voxels', i.e. three-dimensional pixels, wherein each voxel occupies a discrete volume. In data modelling a three dimensional object, a voxel at a given location may have at least one characteristic. For example, it may be empty, or may have a particular color or may represent a particular material, or a particular object property, or the like.

In some examples, data representing a three-dimensional object is processed to generate control data to be used in generating the object.

In some examples, a material volume coverage representation defines print material data, for example detailing the amount of print materials (such as agent(s) to be deposited onto a layer of build material, or in some examples, build materials themselves), and, if applicable, their combinations. In some examples, this may be specified as a proportional volume coverage (for example, X % of a region of a layer of build material should have agent Y applied thereto). Such print materials may be related to or selected to provided an object property such as, for example, color, transparency, flexibility, elasticity, rigidity, surface roughness, porosity, conductivity, inter-layer strength, density, and the like.

The actual location at which each print material (for example, a drop of an agent) should be applied, as specified in control data, may be determined using halftoning techniques.

For example, a set of voxels within object model data may have an associated set of material volume coverage vectors. In a simple case, such a vector may indicate that X % of a given region of three-dimensional space should have a particular agent applied thereto, whereas (100-X) % should be left clear of agent. The material volume coverage representation may then provide the input for a 'halftoning' process to generate control data that may be used by an additive manufacturing system to produce a three-dimensional object. For example, it may be determined that, to produce specified object properties, 25% of a layer of build material (or of a portion of a layer) should have an agent applied thereto. The halftoning process determines where the drops of agent fall in order to provide 25% coverage, for example by comparing each location to a threshold value provided in a halftone threshold matrix.

In some examples, data representing a three-dimensional structure or object is 'rasterized', i.e. converted to series of discrete locations. The rasterized data may be at the printable resolution of the three-dimensional printing apparatus to which control data may be provided.

In some examples, control data is generated such that an object generated according to that data has a substructure. For example, the object may be intended to have an open mesh-like structure, which may make it light and/or shock resistant, and/or reduce material usage. The term 'substructure' is used to distinguish from the structure, or form, of an object model.

FIG. 1 is an example of a method for generating a three dimensional halftone threshold matrix. Such a matrix could be used to generate an object having a substructure.

In block 102, a substructure model representing a three-dimensional material structure is received. This material structure may, for example, represent a mesh-like, or lattice-like structure. Considered in terms of voxels, the physical space occupied by the material structure may comprises a relatively large proportion of un-occupied, or empty voxels. The structure may be a continuous regular structure, such as a mesh or three-dimensional lattice formed of space filling polyhedral or prisms (which may therefore form a regular structure), or irregular (for example, branch-like or vein-like) structure. The structure may be consistent, or may vary over its volume.

In some examples, the substructure model may be an explicit, fully defined three-dimensional model, for example being defined as a vector object. In other examples, the model may be defined on a mathematical or algorithmic basis, for example as computer readable instructions which, when executed, can build or generate a representation of the substructure model.

In block 104, each location in the substructure model at which the structure exists is populated with a halftone threshold to provide a three dimensional halftone threshold matrix. This halftone threshold matrix may be suitable for use in generating control data for manufacturing a three-dimensional object with additive manufacturing apparatus, for example such that the object generated has the substructure specified by the substructure model.

FIG. 2 shows a second example of a method in which a three dimensional halftone threshold matrix is generated. In block 202, information indicative of an object to be generated is received. This information may for example comprise any of size, shape, contour, and resolution information. In block 204, a substructure model representing a three-dimensional material structure is received, for example as described in relation to block 102 above.

In this example, in block 206, the three-dimensional material structure is scaled according to the information indicative of an object to be generated. This allows a substructure model of an appropriate size to be generated.

In some examples, scaling the material structure may comprise tiling, or replicating, a base 'seed' element of the structure. In other examples, scaling the material structure may comprise scaling the material structure or a base element thereof itself: for example, if the structure is made up of cubic structures, the size of the cube may be set depending on the information. Scaling may comprise matching the overall size of the object to be generated (such that, for example, the object and the material structure are substantially the same size, or can be described by a voxel array of the same size). In other examples, scaling may comprise matching the size of the portion of an object to have that substructure (i.e. the substructure could vary over a generated object). Scaling may comprise considering the size of the smallest features of the object to be generated and ensuring that such details can be represented by a material structure of appropriate scale. Scaling may also comprise a consideration of the properties specified for an object to be generated, such as the amount of material to be in a particular volume to ensure that the object has a specified strength.

Scaling may be carried out automatically or with user input. In some examples, a particular structure (e.g. a regular cubic lattice) may be defined at a plurality of resolutions/scales (e.g. using cubes of different sizes as a base element), such that scaling the three-dimensional material structure comprises selecting one of the predefined structures.

A rasterized representation of the substructure model having the (scaled) material structure is then generated (block 208). In some examples, this representation may comprise a plurality of planes, each rasterized into discrete locations. If, as outlined above, the material structure comprises a relatively large proportion of un-occupied, or empty voxels, each plane may be a partially, or sparsely, populated array of values. In some examples, the array is binary: the structure either exists at a location or it does not. In some examples, the array may be in the form of a plurality of binary bitmaps, each binary bitmap representing a plane of the material structure.

In block 210, halftone threshold data is received. In one example, this data may be received as a halftone threshold matrix. In one example, the threshold matrix may comprise the same dimensions as the three-dimensional substructure model itself (i.e. be a three dimensional thresholding matrix). In other examples, the threshold data may be supplied in a different form (for example, portions of a larger threshold matrix may be used), or may be generated according to stored computer readable instructions, or the like.

In this example, the halftone data comprises an array of threshold values. In one example, the threshold values are for carrying out a halftone operation that compares a value of the threshold matrix against a value indicative of a print material (such as an agent(s) or agent combination) probability distribution, for example expressed as an Mvoc (material volume coverage) vector. This chooses a single 'state' (one of the possible materials or material combinations) based on the threshold value.

The print material volume coverage may vary within an object and this variation may be taken into account at the point of constructing a halftone threshold data. For example, a threshold matrix (or matrices) that natively has 'continuous tone' threshold values can be formatted to have local variability. In some examples, the material volume coverage may vary between planes.

In block 212, each location where the material structure of the substructure model exists is populated with a halftone threshold. In an example in which the substructure model has been rasterized into a series of arrays, the series therefore provides (if considered as stack) a three dimensional halftone threshold matrix which carries the structure of the substructure model: as the matrix is null in all locations other than those characterising the structure, applying the matrix will result in no use of an print material at that null location, whatever the volume coverage specified for the location. This threshold matrix may be applied to object model data to generate control data for the production of a three-dimensional object (block 214).

The halftone thresholds may be determined according to halftoning techniques such as void-and-cluster matrices, error diffusion techniques, dither based techniques, AM-screens, cluster-dot type patterns etc. In other examples, rather than supplying a three-dimensional matrix and using this to populate the substructure model, the substructure model may be directly populated with halftone data determined, for example, according to one of these techniques.

FIG. 3 shows an example of processing apparatus 300 that may be used to generate control data for production of a three-dimensional object. The apparatus 300 in this example comprises an interface 302, an image processor 304, a mapping module 306, a halftone generator 308 and a substructure module 310.

In the example of FIG. 3, the data representing a three-dimensional model object 312 comprises object model data 316 and object property data 318. The object model data 316 may define a three-dimensional model of at least a portion of the model object 312. In FIG. 3, the object 312 is a simple cube although it will be appreciated that the object could have other, and more complex, forms. The model object 312 may define the shape and extent of all or part of an object in a three-dimensional co-ordinate system, e.g. the solid portions of the object. The object model data 316 may be generated by a computer aided design (CAD) application. Object property data 318 defines at least one object property for the three-dimensional object to be generated. In one case, the object property data 318 may comprise a color, flexibility, elasticity, rigidity, surface roughness, porosity, interlayer strength, density, conductivity and the like for at least a portion of the object to be generated. Object property data 318 may be defined, for example, for the whole of an object to be generated, e.g. global property data, or for one or multiple portions of an object to be generated, e.g. local property data. The object property data 318 may also be used to define multiple object properties for a portion or portions of an object.

When used to generate a three-dimensional object, the control data 314 will generate an object based on the input object data 316, 318 with the addition of a structure specified in the substructure module 310.

In more detail, the interface 302 receives the data 316, 318 representing the three-dimensional model object 312. In some examples, the interface 302 may receive the object model data 316 and the object property data 318 as a single file; in other examples the interface 302 may receive portions of the object model data 316 and/or the object property data 318 as multiple data objects, wherein the object model data 316 and the object property data 318 are distributed across a number of associated data structures. In one example, the object model data 316 may comprise voxels that are defined in a three-dimensional (also referred to herein as [x,y,z]) space. A given voxel may have associated data that indicates whether a portion of the model object 312 is present at that location. As described above, the object property data 318 may comprise global and local object property data, e.g. certain object property values as defined in the object property data 318 may be associated with each voxel that defines the object and/or certain object property values may be associated with a set of voxels, e.g. ranging from individual voxels to all voxels associated with the object. In one case, the data representing the three-dimensional object comprises a model of a three-dimensional object that has at least one object property specified at every location within the model, e.g. at every [x, y, z] co-ordinate.

In this example, the image processor 304 receives the object model data 316 and the object property data 318 from the interface 302. The image processor 304 processes at least the object model data 316 and generates a rasterized representation of the three-dimensional object. In an example, the image processor 304 may generate slices of parallel planes of a model of the three-dimensional object which are then rasterized. Each slice may relate to a portion of a respective layer of build material in an additive manufacturing system. In a three-dimensional space that uses a three-coordinate system, e.g. that uses [x, y, z] co-ordinates, these parallel planes may be z-slices, planes that are parallel to x and y axes (or the xy-plane). Each z-slice may comprise portion(s) of a model that have a common z co-ordinates and that extend in the x and y dimensions. The number of z-slices may depend on a resolution of detail in the z dimension and/or the output resolution of a layer of build material(s).

In this example, the image processor 304 outputs a plurality of two-dimensional raster objects 320, each representing a plane of the three dimensional space in which the model object 312 is defined. Each of these two-dimensional raster objects may comprise an image such as a bitmap.

In this example, the image processor 304 associates at least one object property value with each location in a raster object. For example, each raster object may comprise a set of pixels that extend in the x and y dimensions; each pixel may then be associated with at least one object property value. In the case that one of the object properties defines a color, the color may be defined in a color space, such as: a monochrome contone space, e.g. grayscale; a Red, Green, Blue (RGB) color space; the International Commission on Illumination (CIE) 1931 XYZ color space, wherein three variables ('X', 'Y' and 'Z' or tristimulus values) are used to model a color; the CIE 1976 (L*, a*, b*—CIELAB or 'LAB') color space, wherein three variables represent lightness ('L') and opposing color dimensions ('a' and 'b'); or any other color space or derived color space. A color value in these color spaces may comprise a continuous tone value, e.g. a value within a predefined range of values. For example, in a simple case, an RGB color value may comprise three 8-bit values; as such each red, green and blue value may be within the range of 0 to 255. Object properties may be defined implicitly and/or explicitly and may comprise any of, amongst others: a flexibility value; an elasticity value; a rigidity value; a surface roughness value; a porosity value; a strength value; and a density value.

The mapping module 306 receives the output of the image processor 304 and maps a rasterized representation generated by the image processor 304 to an volume coverage representation of the three-dimensional object. In this example, the mapping module 306 receives raster objects as described above. These may be received one by one, e.g. in an order representative of an ascending height of the object, or as a collection, e.g. all slices of the model object. In one example, the mapping module 306 maps object properties to material volume coverage (Mvoc) vectors. In some example, the mapping module may receive the object model data 316 and the object property data 318 from the interface 302 directly.

An Mvoc vector may have a plurality of values, wherein each value defines a proportion for each, or each combination of print materials in an addressable location of a layer of the three-dimensional object. For example, in an additive manufacturing system with two available print materials (for example, agents)—M1 and M2, where each print material may be independently deposited in an addressable area of a layer of the three-dimensional object, there may be $2^2$ (i.e. four) proportions in a given Mvoc vector: a first proportion for M1 without M2; a second proportion for M2 without M1, a third proportion for an over-deposit (i.e. a combination) of M1 and M2, e.g. M2 deposited over M1 or vice versa; and a fourth proportion for an absence of both M1 and M2. In this case an Mvoc vector may be: [M1, M2, M1M2, Z] or with example values [0.2, 0.2, 0.5, 0.1]—i.e. in a given [x, y] location in a z slice, 20% M1 without M2, 20% M2 without M1, 50% M1 and M2 and 10% empty. As each value is a proportion and the set of values represent the available material combinations, the set of values in each vector sum to 1 or 100%.

For example, in a case where the agents are colored, then the Mvoc vector may be determined to generate select agent combinations that generate a match with a supplied object property, e.g. a supplied RGB value. This match may be implicit in the mapping.

The halftone module 308 and the substructure module 310 operate on the volume coverage representation (for example comprising at least one Mvoc vector), either directly and independently, or having been combined such that a substructure is populated by the halftone module 308 to provide a halftone threshold matrix. The material structure of the substructure module 310 may comprise any structure, such as a regular three-dimensional lattice (e.g. a honeycomb structure based on any space-filling polyhedral such as a cube, and octahedron, or the like), a space-filling polyhedron, or forms of bio-mimicry (e.g. vein or branch-like design). Each of these substructure types may be referred to as a substructure model. In some examples, a substructure model may be defined explicitly by having an input three-dimensional model that describes its geometry in its entirety, for example in a vector domain and/or designed using a CAD program. In other examples, the structure of a substructure model may be defined implicitly or analytically, for example as being based on a regular lattice, space-filling polyhedral, or fractals, or otherwise generated according to machine readable instructions. In some examples, substructure models may be formed of tile-able elements, such that a structure (for example a cubic structure, or an octahedron structure, or a branch-like element) may be repeated in forming a substructure model. Such a tile-able elements may be used as a seed to provide a substructure for an object to be generated. In some examples, the substructure module 310 may tile a base element or seed, such as a cube or other shape, to provide a substructure model 322. In some examples, the substructure module 310 may generate a rasterized representation of the substructure model 322.

In some examples, the substructure module 310 may change the dimensions of a base unit, or seed. This may be to ensure that features of the object, such as finer features may be represented in the object generated.

In the example of FIG. 3, the substructure model 322 comprises a stacked cuboid mesh or cubic lattice structure which is relatively sparse in its occupied volume. The substructure module 310 may effectively replicate, or tile, data representing a number of cubes or cuboid meshes until the substructure model 322 would occupy the same volume as the model object 312. In other examples, other shapes or forms could be replicated and tiled to form a substructure model 322, or the substructure model could be 'grown', for example from space filling polyhedra, in its entirety, for example to fill a predetermined volume, which may the same as the volume of the model object 312.

The halftone module 308 provides halftone threshold data, in one example having at least one stored halftone threshold matrix.

The halftone module 308 and the substructure module 310 together generate a halftone threshold matrix, which is populated with instructions to selectively cause a print material to be deposited where the substructure exists and can be applied to a volume coverage representation (for example an Mvoc vector) to generate control data, for example in the form of a set of discrete print material choices for a pixel in a plane, wherein the discrete values across the area of the plane may be representative of proportions set out in the volume coverage representation. In some examples, the substructure model 322 is rasterized before being populated. In the example of FIG. 3, some planes of the object would have a square grid like pattern, while other planes would contain a sparser matrix, representing the cross-section of the upwardly extending sides of the stacked cubes.

Figure 4:
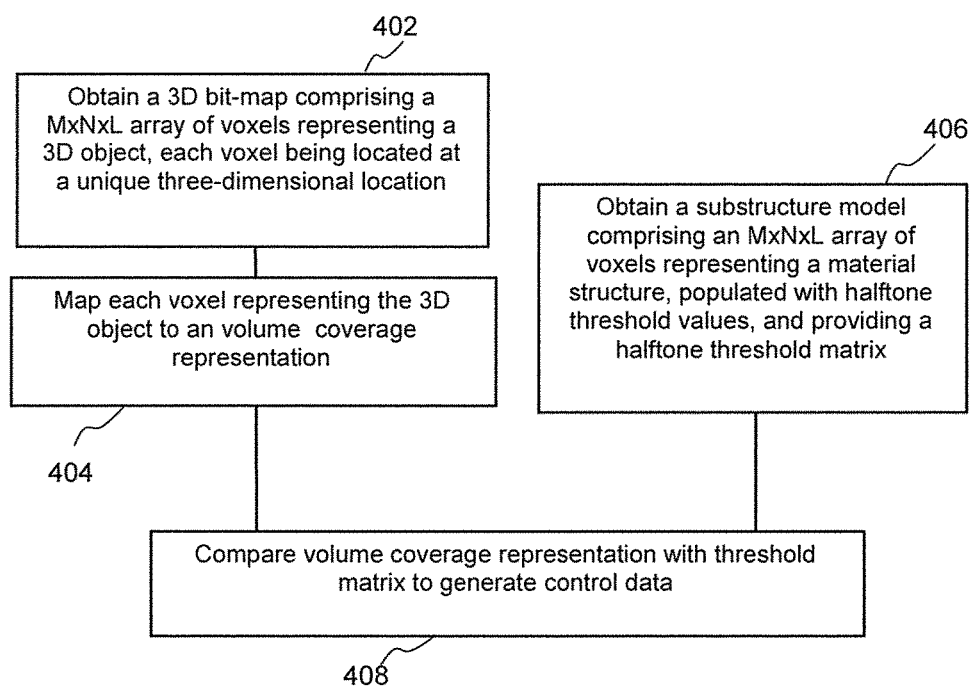
FIG. 4 is an example of a method for generating control data for production of a three-dimensional object.

An example of a method of generating control data for production of a three-dimensional object is set out in FIG. 4. In block 402, a three-dimensional bit-map comprising a M×N×L array of voxels representing a three dimensional model object (which may be all or a portion of an object) is obtained, in which M, N and L are positive integers and in which each voxel is located at a unique three-dimensional location. In some examples, the M×N×L array of voxels is a cuboid which encloses at least a portion of (and in some examples, all of) a three dimensional model object. In block 404, each voxel representing the three dimensional object is mapped to a volume coverage representation, the volume coverage representation specifying print material as proportions of a set of available print materials at the location. In some examples, before being so mapped, the model object may be rasterized into a plurality of planes. The number of planes used may depend on any of several factors, for example, the type of build material, type of coalescing agent, type of coalescence modifier agent(s) used, thickness per layer to provide the properties and/or finish etc.

In block 406, a substructure model comprising an M×N×L array of voxels representing a material structure is obtained. Such a substructure model may be based on, or grown from, a seed or base element, such as a cube or other space-filling polyhedron which follows predetermined rules. There may be a number of substructure models and obtaining a substructure model may comprise selecting substructure model. The substructure may be a relatively open mesh structure. The substructure may vary over its volume. The substructure model is populated with halftoning data to provide a three-dimensional halftone threshold matrix. In some examples, before being populated, the substructure may be rasterized into planes. The number of planes may be the same as the number of slices as the model object.

The volume coverage representation is then compared with the threshold values of the threshold matrix representing the same three-dimensional location to generate control data for printing a three-dimensional object based on the model object and having a material substructure according to the substructure model (block 408).

In some examples herein, a model object is provided in order that an object may be generated. However, the generated object is intended to have a substructure which is provided not as model object data, but as a part of a halftoning operation. This allows a substructure to specified and/or applied later in design pipeline, and therefore a new or different substructure may be more readily applied to an object to be generated.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus, such the processing apparatus 300, may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices provide a means for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It should be noted that the above-mentioned examples illustrate rather than limit what is described herein, and that those skilled in the art will be able to design many alternative implementations without departing from the scope of the appended claims. In particular, a feature or block from one example may be combined with or substituted by a feature/block of another example The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A processing apparatus, comprising:
   an interface to receive:
      request information for a three-dimensional (3D) object to be generated, wherein the request information includes a size and shape of the 3D object to be generated; and
      a substructure model for a 3D material structure, wherein substructure is a mesh-like structure having some physical space occupied by the material structure and some unoccupied, empty space;
   a processor; and
   a memory storing instructions that are executable to cause the processor to:
      generate a rasterized representation of the substructure model for the 3D material structure, the rasterized representation comprising a plurality of parallel planes, each plane including a binary bitmap, wherein each value in the binary bitmap of each plane indicates either the unoccupied, empty space of the 3D material structure or a discrete location of the physical space where the 3D material structure exists;
      populate each of the discrete locations of each of the plurality of parallel planes where the 3D material structure exists with a halftone threshold to generate a 3D halftone threshold matrix;
      apply the request information, including the size and shape, of the 3D object to the 3D halftone threshold matrix to generate control data, wherein the control data is for controlling a manufacturing of the 3D object; and
      cause the 3D object to be generated based on the control data.

2. The processing apparatus according to claim 1, wherein, prior to generating the rasterization representation, the instructions are executable to cause the processor to scale the 3D material structure of the substructure model to the size of the 3D object to be generated.

3. The processing apparatus according to claim 1, wherein the received request information further includes contour and resolution information for the 3D object to be generated.

4. The processing apparatus according to claim 1, wherein, to generate the rasterization representation of the substructure model, the instructions are executable to cause the processor to:
   generate slices representing the parallel planes of the substructure model for the 3D material structure, wherein each slice relates to one of a plurality of layers of build material in an additive manufacturing system, and
   rasterize each of the slices to generate the rasterization representation of the substructure model.

5. The processing apparatus according to claim 4, wherein each of the slices uses x, y, and z coordinates, wherein the z-coordinate of the respective slice is common with the z-coordinates of other slices, and extends in the x and y dimensions.

6. A method comprising:
   receiving, by a processor of a computing device, request information for a three-dimensional (3D) object to be generated, wherein the request information includes a size and shape of the 3D object to be generated;
   receiving, by the processor, a substructure model for a 3D material structure, wherein substructure is a mesh-like structure having some physical space occupied by the material structure and some unoccupied, empty space;
   generating, by the processor, a rasterized representation of the substructure model for the 3D material structure, the rasterized representation comprising a plurality of parallel planes, each plane including a binary bitmap, wherein each value in the binary bitmap of each plane indicates either the unoccupied, empty space of the 3D material structure or a discrete location of the physical space where the 3D material structure exists;
   populating, by the processor, each of the discrete locations of each of the plurality of parallel planes where the 3D material structure exists with a halftone threshold to generate a 3D halftone threshold matrix;
   applying, by the processor, the request information, including the size and shape, of the 3D object to the 3D halftone threshold matrix to generate control data, wherein the control data is for controlling a manufacturing of the 3D object; and
   causing, by the processor, the 3D object to be generated based on the control data.

7. The method according to claim 6, further comprising:
   prior to generating the rasterization representation, scaling, by the processor, the 3D material structure of the substructure model to the size of the 3D object to be generated.

8. The method according to claim 6, wherein each plane of the parallel planes uses x, y, and z coordinates, wherein the z-coordinate of the respective plane is common with the z-coordinates of other planes, and extends in the x and y dimensions.

9. A non-transitory computer readable medium storing instructions that when executed by a processor cause the processor to:

receive request information for a three-dimensional (3D) object to be generated, wherein the request information includes a size and shape of the 3D object to be generated;

receive a substructure model for a 3D material structure, wherein substructure is a mesh-like structure having some physical space occupied by the material structure and some unoccupied, empty space;

generate a rasterized representation of the substructure model for the 3D material structure, the rasterized representation comprising a plurality of parallel planes, each plane including a binary bitmap, wherein each value in the binary bitmap of each plane indicates either the unoccupied, empty space of the 3D material structure or a discrete location of the physical space where the 3D material structure exists;

populate each of the discrete locations of each of the plurality of parallel planes where the 3D material structure exists with a halftone threshold to generate a 3D halftone threshold matrix;

apply the request information, including the size and shape, of the 3D object to the 3D halftone threshold matrix to generate control data, wherein the control data is for controlling a manufacturing of the 3D object; and cause the 3D object to be generated based on the control data.

10. The non-transitory computer readable medium of claim 9, wherein, prior to the generation of the rasterization representation, the instructions are executable to cause the processor to scale the 3D material structure of the substructure model to the size of the 3D object to be generated according to the request information.

11. The non-transitory computer readable medium of claim 9, wherein the received request information further includes contour and resolution information for the 3D object to be generated.

12. The non-transitory computer readable medium of claim 9, wherein, to generate the rasterization representation of the substructure model, the instructions are executable to cause the processor to:

generate slices representing the parallel planes of the substructure model for the 3D material structure, wherein each slice relates to one of a plurality of layers of build material in an additive manufacturing system, and rasterize each of the slices to generate the rasterization representation of the substructure model.

13. The non-transitory computer readable medium of claim 12, wherein each of the slices uses x, y, and z coordinates, wherein the z-coordinate of the respective slice is common with the z-coordinates of other slices, and extends in the x and y dimensions.

* * * * *